United States Patent [19]
Lorkowski

[11] 4,017,103
[45] Apr. 12, 1977

[54] GARDEN HOSE COUPLER

[75] Inventor: Jonathan L. Lorkowski, Tallmadge, Ohio

[73] Assignee: The Raymond Lee Organization, Inc., New York, N.Y.; a part interest

[22] Filed: July 28, 1975

[21] Appl. No.: 599,702

[52] U.S. Cl. .............................. 285/155; 285/174; 285/256; 285/331; 285/402

[51] Int. Cl.[2] .................... F16L 55/00; F16L 41/00

[58] Field of Search .......... 285/256, 259, 361, 376, 285/377, 331, DIG. 22, 374, 399, DIG. 4, 424, 260, 174, 175, 360, 396, 401, 402, 155, 322

[56] References Cited

UNITED STATES PATENTS

| 649,476 | 5/1900 | Prouty | 285/376 X |
|---|---|---|---|
| 1,890,011 | 12/1932 | Wirz et al. | 285/376 X |
| 2,064,014 | 12/1936 | Koelkebeck | 285/259 X |
| 2,421,228 | 5/1947 | White | 285/361 X |
| 2,562,116 | 7/1951 | Nelson | 285/259 X |

FOREIGN PATENTS OR APPLICATIONS

| 771,968 | 4/1957 | United Kingdom | 285/376 |

Primary Examiner—Dave W. Arola
Attorney, Agent, or Firm—Howard I. Podell

[57] ABSTRACT

An assembly for joining two sections of garden hoses together, with the assembly formed of a male member that couples to a female member. Both members are formed at a first end with an externally corrugated tubular section that fits snugly inside of the end of a garden hose with segments of a shaped circular collar mounted to the corrugated tubular section to clamp externally about the end of the garden hose fitted over the corrugated section. The male fitting is formed at the second end of the fitting as a circular collar formed with a bead that projects from the inner face of the open end of the collar. A pair of pegs also project from the exterior of the male collar. The female fitting is formed at its second end as a circular collar of a size to fit over the male collar with shaped recesses to engage the bead and the pegs of the male collar. Alternate embodiments of the coupler may be formed as a Y-coupling, or coupling members may be formed with a male or female collar joined to a section of threaded tubing. A still further alternate embodiment is in the form of a coupling unit, each end of which is formed as a corrugated tube with a segmented collar mounted about each corrugated end.

5 Claims, 8 Drawing Figures

U.S. Patent         April 12, 1977         4,017,103
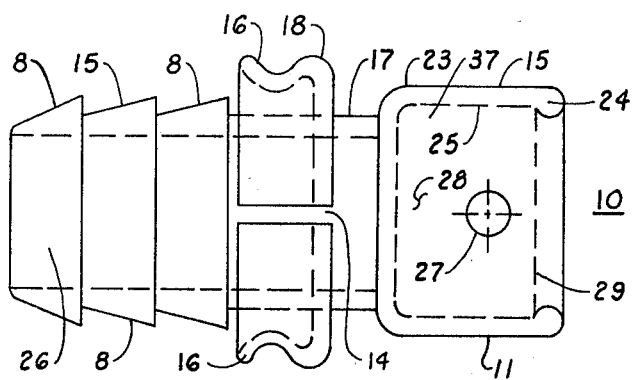
FIG. 1
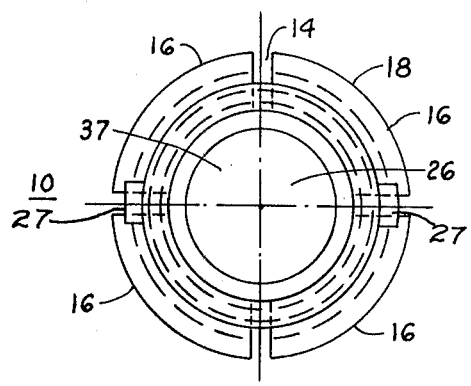
FIG. 2
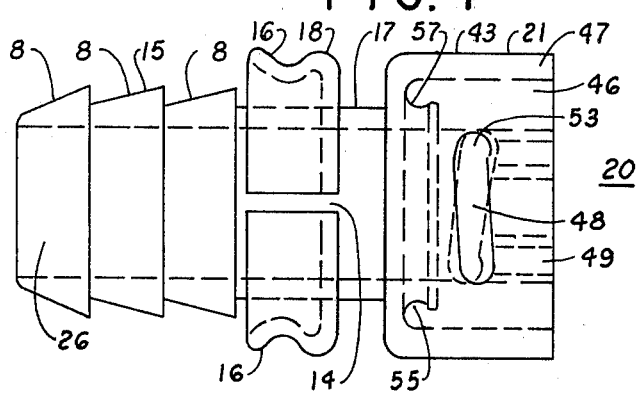
FIG. 3
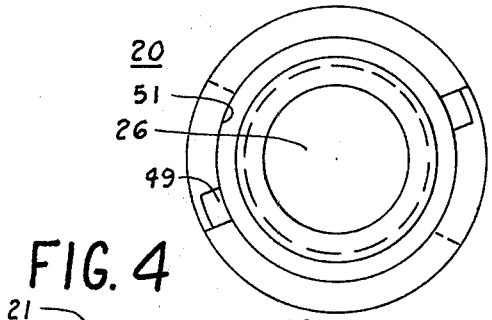
FIG. 4
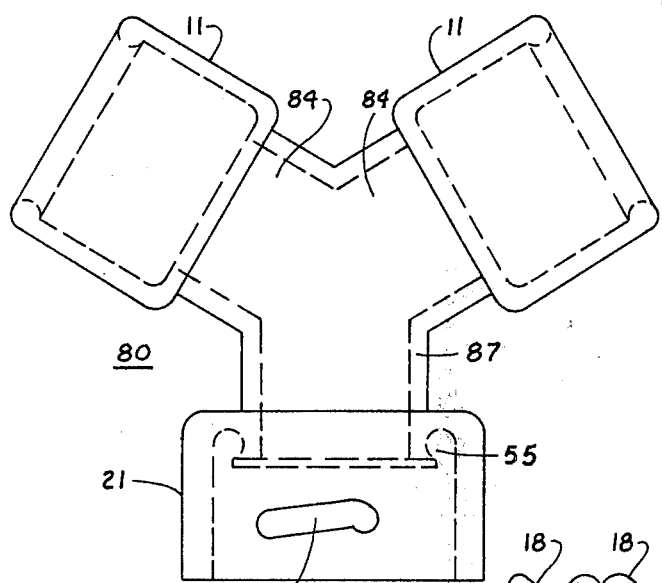
FIG. 5
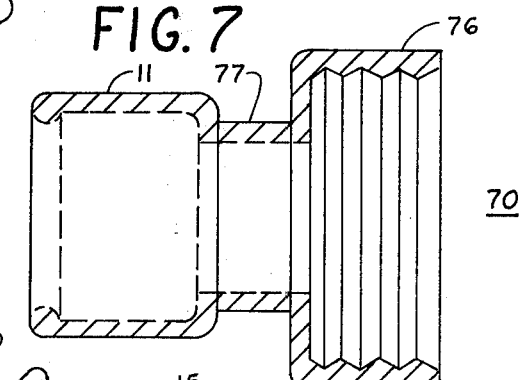
FIG. 7
FIG. 8
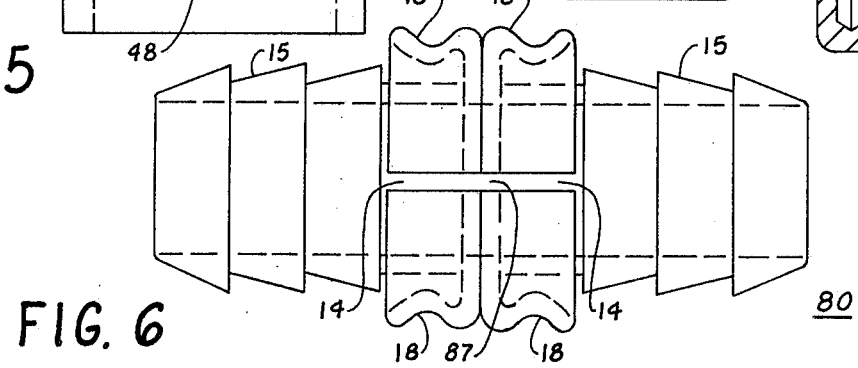
FIG. 6

GARDEN HOSE COUPLER

SUMMARY OF THE INVENTION

My invention is an assembly for joining two sections of garden hoses together, with the assembly formed of a male member that couples to a female member.

Both members are formed at a first end with an externally corrugated tubular section that fits snugly inside of the end of a garden hose with segments of a shaped circular collar mounted to the corrugated tubular section to clamp externally about the end of the garden hose fitted over the corrugated section.

The male fitting is formed at the second end of the fitting as a circular collar formed with a bead that projects from the inner face of the open end of the collar. A pair of pegs also project from the exterior of the male collar.

The female fitting is formed at its second end as a circular collar of a size to fit over the male collar with shaped recesses to engage the bead and the pegs of the male collar.

Alternate embodiments of the coupler may be formed as a Y-coupling, or coupling members may be formed with a male or female collar joined to a section of threaded tubing.

A still further alternate embodiment is in the form of a coupling unit, each end of which is formed as a corrugated tube with a segmented collar mounted about each corrugated end.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a side view of the male coupler;

FIG. 2 is an end view of the male coupler;

FIG. 3 is a side view of the female coupler;

FIG. 4 is an end view of the female coupler;

FIG. 5 is a side view of an alternate embodiment in the form of a Y-coupler;

FIG. 6 is a side view of a further alternate embodiment of the invention;

FIG. 7 is a side view of an alternate form of the female coupler; and

FIG. 8 is a side sectional view of an alternate form of the male coupler.

DESCRIPTION OF THE PREFERRED EMBODIMENT

Turning now descriptively to the drawings, in which similar reference characters denote similar elements throughout the several views, FIGS. 1–2 illustrate the male coupler unit 10 which is designed to matingly engage, in detachable fashion, the female coupler unit 20, shown in FIGS. 3–4, when both couplers 10 and 20 are individually joined to lengths of garden hoses each fastened about the corrugated tubular end section 15 of couplder units 10 and 20.

One end section 15 of each coupler unit 10 and 20 is formed with a through internal axial opening 26 that extends to the collar section 11 or 21 of the coupler 10 and 20, with the exterior wall of each end section 15 formed as a series of circular flanges 8 each tapered away from the collar section 11 or 21. A clamping collar 18 is fitted to the exterior of the mid-section 17 of coupler 10 and 20, with clamping collar 18 open towards the end section 15 and of a size to clamp over the external wall of a garden hose fitted over the tapered circular flanges 8 of the end section 15, Clamping collar 18 is divided by four slots 14 into four segments 16 so that each clamping collar segment 16 may be individually crimped over an engaged end of a garden hose (not shown).

Male coupler 10 is fitted on the end section 23, opposed to end section 15, with a collar 11 fastened to mid-section 17, with a circular rib 24 projecting from the inside wall 25 of collar 11 at the open end 29 of collar 11. A pair of circular pegs 27 project from the exterior surface 28 of collar 11. Internal axial opening 26 extends the length of the coupler end section 15 and mid-section 17 and joins the axial opening 37 of the end section 23.

Female coupler 20 is fitted on end section 43, opposed to end section 15, with a collar 21 fastened to mid-section 17. Collar 21 is formed with an internal axial recess 46 of a size to fit over collar 11 of the male coupler 10, with recess 46 joining internal axial opening 26 that extends the length of coupler end section 15 and mid-section 17. The external wall 47 of collar 21 is formed with a pair of through slots 48 each oriented to engage a peg 27 of engaged male collar 10, with an undercut axial slot 49 joined to one end of each slot 49 in the inner wall surface 51 of female collar 21, and with each through slot 48 oriented in a line at an obtuse angle from slot 49 with slot 49 being of a size to permit sliding of a peg 27 of a male collar 10 into or out through slot 48. Rotation of female collar 21, in the tightening direction with respect to an engaged male collar 11, results in pegs 27 of the male collar being drawn in slot 48 away from slot 49 towards the mid-section 17 of female collar 21 to the hooked end 53 of each slot 48.

A rim 55 is mounted inside female collar 21 joining the mid-section 17 of the coupler 20, with the concave exterior wall 57 of rim 55 shaped to matingly engage the circular rib 24 of an engaged male plug 10, and with the interior axial opening 26 of the coupler 20 extending through rim 55 to join the axial recess 46 of collar 21.

As shown in FIG. 7, a female coupler 60 may be formed with a female collar 21 fastened to a hollow mid-section 67 joined at its other end to a male threaded hollow piug 66, and as shown in FIG. 8, a male coupler 70 may be formed with a male collar 11 joined to a hollow mid-section 77 joined at its other end to a female threaded collar 76.

FIG. 5 illustrates a Y-coupling 80 formed of a Y-shaped hollow mid-section member 87, with two ends 84 of the mid-section member 87 each joined to a male collar 11 and one end 85 of the mid-section member 87 joined to a female collar 21.

FIG. 6 illustrates an alternate embodiment of the coupler 80 in the form of two hollow corrugated ends 15 joined together to a common hollow mid-section 87 for joining two lengths of hose (not shown).

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A coupler assembly for detachably joining together two lengths of flexible garden hose comprising
   a male coupler and a female coupler shaped to matingly detachably engage each other,
   each said coupler formed with a through axial hole extending from a first end to a second end and formed on its first end with means to fasten to a length of flexible hose,
   said male coupler formed at its second end as a collar open to said second end and fitted with a continuous annular rib of generally rounded cross-section projecting from the inside wall of said collar about the rim of the opening of said collar
   said female coupler formed at its second end as a collar open to said second end, with the internal opening of said collar of a size to fit over the collar of the male coupler, and a rim formed inside the collar of the female coupler extending from the interior of the said collar and spaced radially inwardly therefrom, said rim being formed with a recessed annular shape of a size to matingly engage the rib of said male coupler collar when said male coupler collar is nested inside the female coupler collar.

2. The combination as recited in claim 1 in which the first end of said coupler is formed as a corrugated tube to fit into the bore of a flexible hose.

3. The combination as recited in claim 1 in which the first end of a said coupler is formed as a screw thread of a size to engage a mating screw thread of a threaded coupler fastened to a garden hose.

4. The combinations as recited in claim 1 together with a Y unit of hollow tubular construction fitted with three openings with a said coupler formed at the mouth of each opening.

5. The combination as recited in claim 1 in which
   the collar of the male coupler is formed with a detent that projects radially from the external wall of said collar, and
   the collar of the female coupler is fitted with a continuous slot that extends from the opening of said collar, with a section of said slot oriented for a portion of its length at an obtuse angle to the section of said slot that extends initially from the opening of the collar, said slot of a size to slidably engage the detent of the male coupler collar, in the assembled condition.

* * * * *